(12) United States Patent
Kazuno

(10) Patent No.: US 11,479,141 B2
(45) Date of Patent: Oct. 25, 2022

(54) CONTROLLING CHARGING AND DISCHARGING BETWEEN AN ELECTRIC POWER SYSTEM AND A SECONDARY BATTERY

(71) Applicant: HONDA MOTOR CO., LTD., Tokyo (JP)

(72) Inventor: Shuichi Kazuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 17/026,340

(22) Filed: Sep. 21, 2020

(65) Prior Publication Data

US 2021/0122260 A1 Apr. 29, 2021

(30) Foreign Application Priority Data

Oct. 25, 2019 (JP) .............................. JP2019-194018

(51) Int. Cl.
*B60L 53/66* (2019.01)
*B60L 50/60* (2019.01)
(Continued)

(52) U.S. Cl.
CPC ............... *B60L 53/66* (2019.02); *B60L 50/60* (2019.02); *H01M 10/425* (2013.01);
(Continued)

(58) Field of Classification Search
CPC .......... B60L 55/00; B60L 53/66; B60L 50/60; H02J 7/00036; H02J 7/0071;
(Continued)

(56) References Cited

U.S. PATENT DOCUMENTS

| 10,529,037 | B2 * | 1/2020 | Forbes, Jr. ............. H04L 69/325 |
| 2012/0007563 | A1 * | 1/2012 | Muto ........................ H02J 3/32 320/128 |

(Continued)

FOREIGN PATENT DOCUMENTS

| JP | 04-029532 | 1/1992 |
| JP | 2009-183086 | 8/2009 |

(Continued)

OTHER PUBLICATIONS

Japanese Office Action for Japanese Patent Application No. 2019-194018 dated Oct. 12, 2021.

(Continued)

*Primary Examiner* — Nathaniel R Pelton
(74) *Attorney, Agent, or Firm* — Amin, Turocy & Watson, LLP

(57) ABSTRACT

A management apparatus that controls charging and discharging between an electric power system and a secondary battery which is mounted on a vehicle and which stores electric power used for traveling of the vehicle includes: an acquisition part that acquires at least one of registration information indicating a use acceptance of the electric power and information indicating a use application of the electric power; and a management part that controls a supply of the electric power from the secondary battery to the electric (Continued)

power system in accordance with the presence or absence of the registration information or the use application of the electric power.

9 Claims, 8 Drawing Sheets

(51) Int. Cl.
  *H02J 7/00* (2006.01)
  *H01M 10/44* (2006.01)
  *H01M 10/42* (2006.01)
(52) U.S. Cl.
  CPC ......... *H01M 10/44* (2013.01); *H02J 7/00036* (2020.01); *H02J 7/0071* (2020.01); *H01M 2010/4271* (2013.01); *H01M 2010/4278* (2013.01); *H01M 2220/20* (2013.01)
(58) Field of Classification Search
  CPC ............ H01M 10/425; H01M 10/44; H01M 2010/4271; H01M 2010/4278; H01M 2220/20

USPC ........................................................ 320/109
  See application file for complete search history.

(56) References Cited

U.S. PATENT DOCUMENTS

| | | | |
|---|---|---|---|
| 2019/0288347 A1* | 9/2019 | Yokoyama | H01M 10/486 |
| 2020/0353839 A1* | 11/2020 | Tarchinski | B60L 58/12 |
| 2021/0053458 A1* | 2/2021 | Fujiwara | B60L 55/00 |

FOREIGN PATENT DOCUMENTS

| | | |
|---|---|---|
| JP | 2011-239202 | 11/2011 |
| JP | 2016-123270 | 7/2016 |
| WO | 2012/020756 | 2/2012 |
| WO | 2018/084152 | 5/2018 |

OTHER PUBLICATIONS

Japanese Office Action for Japanese Patent Application No. 2019-194018 dated May 11, 2021.

* cited by examiner

FIG. 3

| VEHICLE ID | STORED ELECTRIC POWER AMOUNT | DISCHARGE MODE |
|---|---|---|
| c0001 | ○○kW | 100sec·50kW, 10sec·70kW, 1sec·100kW |
| c0002 | ○○kW | 100sec·50kW |
| c0003 | ○○kW | 100sec·50kW, 10sec·70kW |
| c0004 | ○○kW | 100sec·50kW, 10sec·70kW, 1sec·100kW |

FIG. 4

| VEHICLE ID | NON-USE TIME PERIOD |
|---|---|
| c0001 | 2019/10/01 18:00 ~ 2019/10/02 7:00 |
| c0003 | 2019/10/01 21:00 ~ 2019/10/03 19:00 |
| c0004 | 2019/10/02 17:00 ~ 2019/10/03 6:00 |
| ⋮ | ⋮ |

FIG. 7

|  | | REQUEST IS DISASTER SUPPORT REQUEST (EMERGENCY USE APPLICATION) | REQUEST IS ORDINARY ELECTRIC POWER REQUEST (ORDINARY USE APPLICATION) |
|---|---|---|---|
| THERE IS REGISTRATION INFORMATION | SET AS NON-USE TIME PERIOD (THERE IS NOT USE SCHEDULE) | SUPPLY ELECTRIC POWER | SUPPLY ELECTRIC POWER |
| | NOT SET AS NON-USE TIME PERIOD (THERE IS POSSIBILITY OF BEING USED) | SUPPLY ELECTRIC POWER (WITH LIMITATION) | NOT SUPPLY ELECTRIC POWER OR SUPPLY ELECTRIC POWER (WITH LIMITATION) |
| THERE IS NOT REGISTRATION INFORMATION | | SUPPLY ELECTRIC POWER (WITH LIMITATION) | NOT SUPPLY ELECTRIC POWER |

CONTROLLING CHARGING AND DISCHARGING BETWEEN AN ELECTRIC POWER SYSTEM AND A SECONDARY BATTERY

CROSS-REFERENCE TO RELATED APPLICATION

Priority is claimed on Japanese Patent Application No. 2019-194018, filed on Oct. 25, 2019, the contents of which are incorporated herein by reference.

BACKGROUND

Field of the Invention

The present invention relates to a management apparatus, a management method, and a program.

Background

In recent years, electric vehicles such as an EV (Electric Vehicle), a HEV (Hybrid Electric Vehicle), and a FCV (Fuel Cell Vehicle) have been widely used. A battery (secondary battery) is mounted on the electric vehicle, and electricity is stored in the battery by charging. The electric vehicle travels by supplying electric power from the battery to the motor. Therefore, a user of the electric vehicle needs to charge the battery of the electric vehicle, for example, by using a charging stand provided in charging stations of various places, a parking area of his/her home, and the like.

In recent years, a system referred to as a V2G (Vehicle to Grid) has been proposed.

In the V2G, electric power is exchanged between an electric vehicle and an electric power system including a commercial utility grid (refer to PCT International Publication No. WO 2018/084152). For example, in the V2G, when the electric vehicle is not used as a transportation means, a battery mounted on the electric vehicle is utilized as if the battery is one of electric power storage facilities in the commercial utility grid.

In the related art, for example, techniques have been disclosed in which, for example, in a time of emergency such as a power failure or natural disaster, a battery mounted on an electric vehicle is utilized as an emergency electric power source (refer to Japanese Unexamined Patent Application, First Publication No. H4-29532 and Japanese Unexamined Patent Application, First Publication No. 2011-239202).

SUMMARY

However, in the related art, there is a problem in that an efficient operation method of a battery in a case where the battery mounted on a vehicle is used as an emergency electric power source or an alternative electric power source for a commercial electric power source has not been sufficiently considered.

An aspect of the present invention is intended to provide a management apparatus, a management method, and a program capable of efficiently using a battery mounted on a vehicle.

A management apparatus according to a first aspect of the present invention is a management apparatus that controls charging and discharging between an electric power system and a secondary battery which is mounted on a vehicle and which stores electric power used for traveling of the vehicle, the management apparatus including: an acquisition part that acquires at least one of registration information indicating a use acceptance of the electric power and information indicating a use application of the electric power; and a management part that controls a supply of the electric power from the secondary battery to the electric power system in accordance with the presence or absence of the registration information or the use application of the electric power.

A second aspect of the present invention is the management apparatus according to the first aspect described above, wherein the management part may identify a first vehicle indicating the vehicle for which the registration information is present and may supply the electric power to the electric power system from a secondary battery mounted on the first vehicle.

A third aspect of the present invention is the management apparatus according to the second aspect described above, wherein the acquisition part may further acquire use schedule information indicating a use schedule of the vehicle, and the management part may identify a second vehicle indicating a vehicle for which the registration information is present and which is in a non-use time period based on the registration information and the use schedule information and may supply the electric power to the electric power system from a secondary battery mounted on the second vehicle.

A fourth aspect of the present invention is the management apparatus according to the third aspect described above, wherein the management part may determine a supply amount of the electric power supplied to the electric power system from the secondary battery mounted on the second vehicle in accordance with a use start schedule timing of the second vehicle indicated by the use schedule information.

A fifth aspect of the present invention is the management apparatus according to the fourth aspect described above, wherein in a case where the electric power is supplied from the electric power system to the secondary battery mounted on the second vehicle when the electric power is not supplied to the electric power system from the secondary battery mounted on the second vehicle, the management part may determine the supply amount such that an electric power amount of the electric power stored in the secondary battery mounted on the second vehicle is equal to or more than a maximum stored electric power amount or a predetermined electric power amount at the use start schedule timing.

A sixth aspect of the present invention is the management apparatus according to the third to fifth aspects described above, wherein the management part may identify a third vehicle indicating the vehicle which is not in a non-use time period based on the use schedule information and may supply the electric power to the electric power system from the secondary battery mounted on the third vehicle such that an electric power amount of the electric power stored in a secondary battery mounted on the third vehicle is equal to or more than a predetermined electric power amount.

A seventh aspect of the present invention is the management apparatus according to the sixth aspect described above, wherein the acquisition part may acquire history information indicating a past use history of the third vehicle, and the management part may determine the predetermined electric power amount based on the history information.

An eighth aspect of the present invention is the management apparatus according to the first to seventh aspects described above, wherein the management part may change a control of a supply of the electric power from the secondary battery to the electric power system in accordance with whether the use application of the electric power is a first use application or the use application is a second use application that is different from the first use application.

A management method according to a ninth aspect of the present invention is a management method that controls charging and discharging between an electric power system and a secondary battery which is mounted on a vehicle and which stores electric power used for traveling of the vehicle, the management method including: acquiring at least one of registration information indicating a use acceptance of the electric power and information indicating a use application of the electric power; and controlling a supply of the electric power from the secondary battery to the electric power system in accordance with the presence or absence of the registration information or the use application of the electric power.

A tenth aspect of the present invention is a computer-readable non-transitory recording medium that includes a program causing a computer to execute: controlling charging and discharging between an electric power system and a secondary battery which is mounted on a vehicle and which stores electric power used for traveling of the vehicle; acquiring at least one of registration information indicating a use acceptance of the electric power and information indicating a use application of the electric power; and controlling a supply of the electric power from the secondary battery to the electric power system in accordance with the presence or absence of the registration information or the use application of the electric power.

According to the first to tenth aspects described above, it is possible to efficiently use the battery mounted on the vehicle.

BRIEF DESCRIPTION OF THE DRAWINGS

FIG. 3 is a view showing an example of assist electric power information according to the first embodiment.

FIG. 4 is a view showing an example of use schedule information according to the first embodiment.

FIG. 7 is a conceptual view showing the contents of a process performed by the management apparatus according to a third embodiment.

DESCRIPTION OF EMBODIMENTS

Hereinafter, embodiments of a management apparatus, a management method, and a program according to the present invention will be described with reference to the drawings.

First Embodiment

Figure 1:
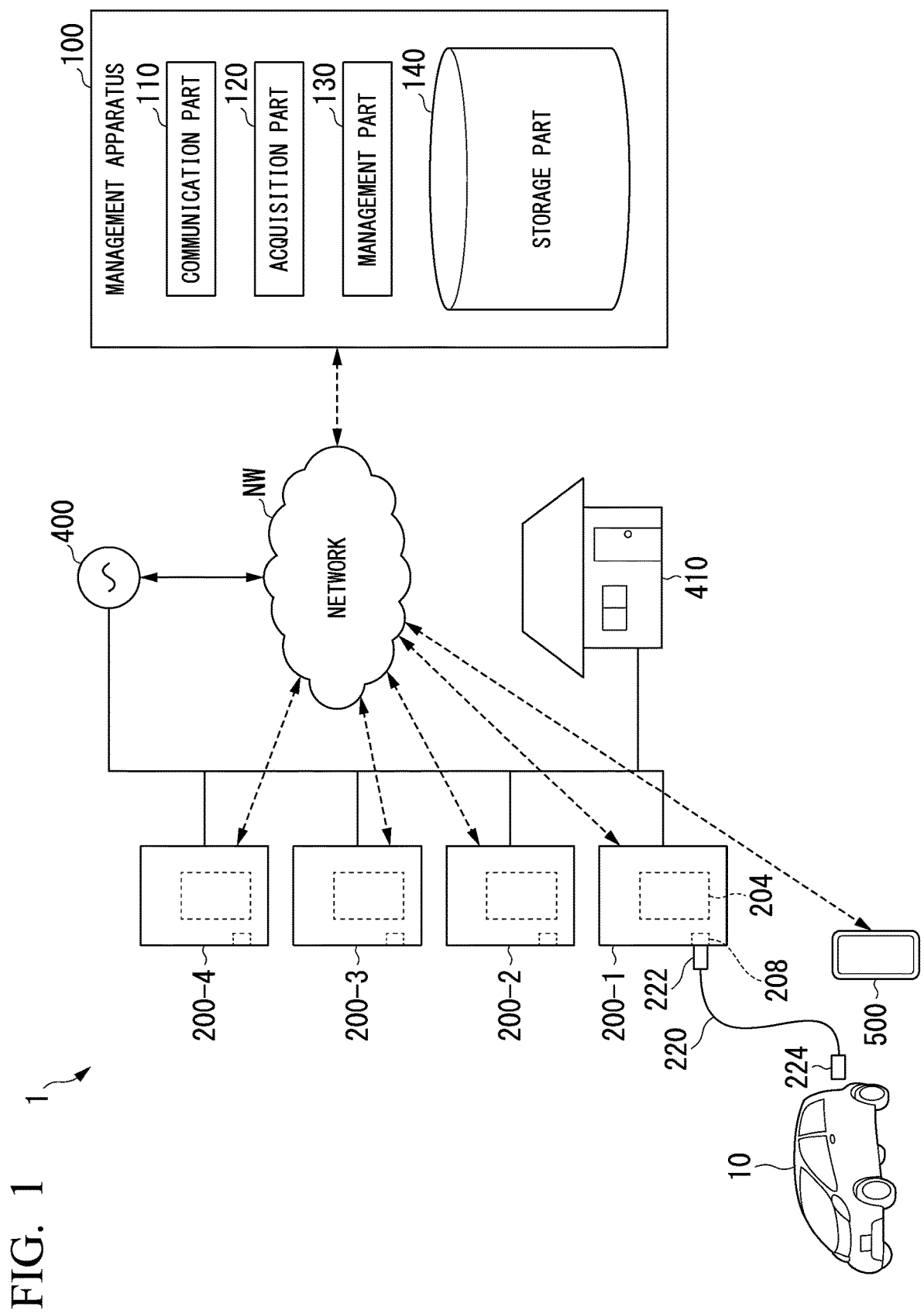
FIG. 1 is a view showing an example of a configuration of a vehicle electric power source control system and use environments according to a first embodiment.

Hereinafter, a first embodiment is described.
[Overall Configuration]
FIG. 1 is a view showing an example of a configuration of a vehicle electric power source control system 1 and use environments according to the first embodiment. As shown in FIG. 1, the vehicle electric power source control system 1 includes a management apparatus 100, charge/discharge devices 200-1 to 200-4, a vehicle 10, an electric power system 400, and a terminal 500. In the following description, when it is not necessary to distinguish between the charge/discharge devices 200-1 to 200-4, the charge/discharge devices 200-1 to 200-4 are simply described as a "charge/discharge device 200". In FIG. 1, as an example, four charge/discharge devices 200 are shown in the drawing; however, the embodiment is not limited thereto. The number of the charge/discharge device 200 may be an arbitrary number as long as the number is one or more.

The management apparatus 100 controls charging and discharging between the electric power system 400 and a battery 40 which will be described below. The battery 40 is a secondary battery (storage battery) that is mounted on the vehicle 10 and that stores electric power used for traveling of the vehicle 10.

The electric power system 400 is a system which supplies electric power to electric power-receiving equipment of a consumer (for example, a user of the vehicle 10 or the like) and in which functions of generation of electrical energy, transformation of electrical energy, transmission of electrical energy, and distribution of electrical energy are integrated. The electric power system 400 includes, for example, an electric power plant, a transformation installation, an electric power transmission line, a distribution installation, an electric transformer, a protection relay system, and the like. The electric power system 400 is connected to a building 410 or the like. The building 410 is, for example, a residential house, a factory, a commercial establishment, and the like. The electric power system 400 supplies electric power to the building 410.

As shown in FIG. 1, the electric power system 400 is connected to at least one charge/discharge device 200. The charge/discharge device 200 is provided near a location where a user of the vehicle 10 (hereinafter, simply referred to as a "user") parks the vehicle 10. The charge/discharge device 200 is installed, for example, in a charging station provided in various places and a parking area at a user's home, a place of work, or the like. The electric power system 400 supplies electric power to the vehicle 10 connected to the charge/discharge device 200.

Figure 2:
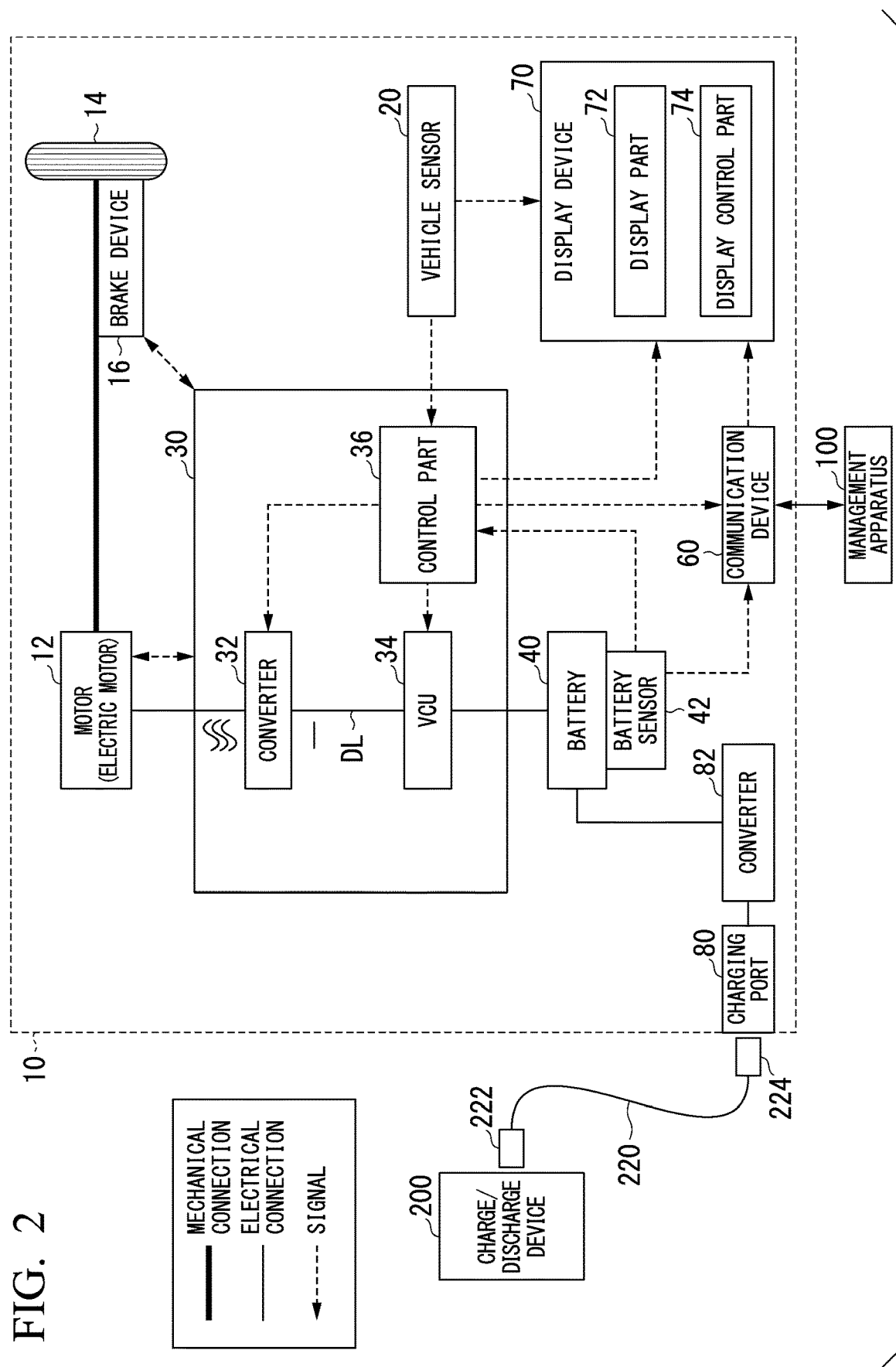
FIG. 2 is a view showing an example of a configuration of a vehicle according to the first embodiment.

[Vehicle Configuration]
Hereinafter, a configuration of the vehicle 10 is described.
FIG. 2 is a view showing an example of the configuration of the vehicle 10 according to the first embodiment. The vehicle 10 is an electric vehicle (EV) that travels by a motor 12 (electric motor) driven by electric power supplied from the battery 40. In the present embodiment, the vehicle 10 is an electric vehicle but is not limited thereto. The vehicle 10 may be a vehicle capable of storing electricity from an external source and may be a vehicle on which a battery (secondary battery) that supplies electric power for traveling is mounted. For example, the vehicle 10 may be a hybrid electric vehicle (HEV), a fuel cell vehicle (FCV), or the like.

The vehicle 10 is not limited to a four-wheel vehicle but may be, for example, a saddle riding type two-wheel vehicle, a three-wheel vehicle (such as a vehicle having one front wheel and two rear wheels or a vehicle having two front wheels and one rear wheel), an electrically assisted bicycle, or the like. That is, all types of vehicles that travel by an electric motor driven by electric power generated by an operation of an internal combustion engine or electric power supplied from a battery can be used for the vehicle 10 according to the present embodiment.

As shown in FIG. 2, the vehicle 10 includes, for example, a motor 12, a drive wheel 14, a brake device 16, a vehicle sensor 20, a PCU (Power Control Unit) 30, the battery 40, a battery sensor 42, a communication device 60, a display device 70, a charging port 80, and a converter 82.

The motor 12 is, for example, a three-phase alternate current electric motor. A rotor (not shown) of the motor 12 is connected to the drive wheel 14. The motor 12 outputs power to the drive wheel 14 by using supplied electric power. The motor 12 performs electric power generation by using a kinetic energy of the vehicle 10 at the time of deceleration of the vehicle 10.

The brake device 16 includes, for example, a brake caliper, a cylinder that transmits a hydraulic pressure to the brake caliper, and an electric motor that generates hydraulic pressure in the cylinder. The brake device 16 may include, as a backup, a mechanism that transmits the hydraulic pressure generated by an operation of a brake pedal to the cylinder via a master cylinder. The brake device 16 is not limited to the configuration described above and may be an electronically controlled hydraulic brake device that transmits the hydraulic pressure of the master cylinder to the cylinder.

The vehicle sensor 20 includes an accelerator opening degree sensor, a vehicle speed sensor, and a brake depression amount sensor. The accelerator opening degree sensor is attached to an accelerator pedal. The accelerator opening degree sensor detects an operation amount of the accelerator pedal and outputs, as an accelerator opening degree, the detected operation amount to a control part 36. The vehicle speed sensor includes, for example, a wheel speed sensor attached to each wheel and a speed calculator. The vehicle speed sensor derives a speed (vehicle speed) of the vehicle by combining wheel speeds detected by wheel speed sensors and outputs the derived vehicle speed to the control part 36 and the display device 70.

The brake depression amount sensor is attached to the brake pedal. The brake depression amount sensor detects an operation amount of the brake pedal and outputs, as a brake depression amount, the detected operation amount to the control part 36.

The PCU 30 includes, for example, a converter 32, a VCU (Voltage Control Unit) 34, and the control part 36. In the present embodiment, the converter 32, the VCU 34, and the control part 36 are constitution elements of the PCU 30 but are not limited to such a configuration. Such constitution elements may not be arranged integrally as the constitution elements of the PCU 30 but may be arranged in a distributed manner in the vehicle 10.

The converter 32 is, for example, an AC-DC converter. A DC side terminal of the converter 32 is connected to a direct current link DL. The battery 40 is connected to the direct current link DL via the VCU 34. The converter 32 converts an alternate current generated by the motor 12 into a direct current and outputs the converted direct current to the direct current link DL.

The VCU 34 is, for example, a DC-DC converter. The VCU 34 increases the voltage of electric power supplied from the battery 40 and outputs the electric power to the direct current link DL.

The control part 36 includes, for example, a motor control unit, a brake control unit, and a battery and VCU control unit. The motor control unit, the brake control unit, and the battery and VCU control unit may be replaced by separate control devices which are, for example, control devices such as a motor ECU, a brake ECU, and a battery ECU.

The motor control unit controls the motor 12 on the basis of an output of the vehicle sensor 20. The brake control unit controls the brake device 16 on the basis of the output of the vehicle sensor 20. The battery and VCU control unit calculates a battery charge rate (SOC; State Of Charge) of the battery 40 on the basis of an output of the battery sensor 42 attached to the battery 40. The battery and VCU control unit outputs information (hereinafter, referred to as "SOC information") including the calculated SOC and the like to the VCU 34, the display device 70, and the communication device 60.

The battery and VCU control unit calculates a stored electric power amount of the battery 40 on the basis of the output of the battery sensor 42. The battery and VCU control unit outputs, to the communication device 60, the calculated stored electric power amount, information indicating the type of electric power that can be assisted, and a vehicle ID which is an identifier for identifying the vehicle 10. Hereinafter, information including the stored electric power amount of the battery 40, the information indicating the type of electric power that can be assisted, and the vehicle ID is referred to as "assist electric power information".

The "information indicating the type of electric power that can be assisted" described above is information indicating a discharge mode which the vehicle 10 can deal with when discharging electric power in a case where the battery 40 is utilized by the V2G as if the battery 40 is one of electric power storage facilities in a commercial utility grid. The information is, for example, information including values such as "1 sec and 100 kW" indicating a discharge mode in which electric power of 100 kW is discharged in 1 second, "10 sec and 70 kW" indicating a discharge mode in which electric power of 70 kW is discharged in 10 seconds, and "100 sec and 50 kW" indicating a discharge mode in which electric power of 50 kW is discharged in 100 seconds.

FIG. 3 shows an example of the assist electric power information according to the first embodiment. As shown in the drawing, the assist electric power information is, for example, data in which the "vehicle ID", the "stored electric power amount", and the "discharge mode" are mutually associated. The assist electric power information shown in FIG. 3 indicates that, for example, a vehicle 10 having a vehicle ID of "c0001" is capable of discharging in three discharge modes of "1 sec and 100 kW", "10 sec and 70 kW", and "100 sec and 50 kW", and a vehicle 10 having a vehicle ID of "c0002" is capable of discharging only in a discharge mode of "100 sec and 50 kW".

The V2G is a system in which, when the vehicle 10 is not used as a transportation means, the battery 40 mounted on the vehicle 10 is utilized as an electric power storage facility, and an interactive exchange of electric power is performed between the electric power system 400 and the vehicle 10 that participates in the V2G.

The vehicle 10 registered to participate in the V2G performs continuous discharging aiming at maintaining a balance of supply and demand in the electric power system 400 or performs charging and discharging aiming at stabilizing a frequency in the electric power system 400 in accordance with the situation of the electric power system 400. The electric power obtained by the continuous discharging of the vehicle 10 aiming at maintaining a balance of supply and demand is utilized as an "instantaneous operation reserve power (spinning reserve)" of the electric power system 400. The continuous discharging for the instantaneous operation reserve power is performed aiming at supplying electric power to the electric power system 400 required for maintaining the balance of supply and demand, particularly, in accordance with an increase in electric power demand in the electric power system 400.

The VCU 34 increases the voltage of the DC link DL in response to a command from the battery and VCU control unit. The motor control unit calculates an electric power cost of the vehicle 10 on the basis of the output of the vehicle sensor 20 and the transition of the SOC of the battery 40. The motor control unit calculates the electric power cost of the vehicle 10 for each drive mode.

The battery 40 is, for example, a secondary battery such as a lithium-ion battery. The battery 40 stores electric power introduced from the charge/discharge device 200 at the outside of the vehicle 10, performs discharging for traveling or the like of the vehicle 10 utilized as a transportation means, and performs continuous discharging that aims at maintaining the balance of supply and demand in the electric power system 400.

The battery sensor 42 includes, for example, a current sensor, a voltage sensor, and a temperature sensor. The battery sensor 42 detects, for example, a current value, a voltage value, and a temperature of the battery 40. The battery sensor 42 outputs information indicating the detected current value, the detected voltage value, the detected temperature, and the like to the control part 36.

The communication device 60 includes, for example, a wireless module for connecting to a cellular network, a Wi-Fi network, or the like. The communication device 60 transmits, for example, the SOC information, the assist electric power information, and the like output from the battery and VCU control unit of the control part 36 to the management apparatus 100 via the network NW.

The display device 70 includes, for example, a display part 72, and a display control part 74. The display part 72 is constituted of, for example, a liquid crystal display or the like and displays information in response to the control of the display control part 74. The display control part 74 causes the display part 72 to display, for example, an image based on information transmitted from the management apparatus 100 in accordance with the information output from the control part 36 and the communication device 60. The display control part 74 causes the display part 72 to display information indicating, for example, the vehicle speed output from the vehicle sensor 20, the SOC output from the battery and VCU control unit, and the like.

The charging port 80 is provided on a housing of the vehicle 10 to be directed toward the outside of the vehicle body. The charging port 80 is connected to the charge/discharge device 200 via a charging cable 220. The charging cable 220 includes a first plug 222 and a second plug 224. The first plug 222 is connected to the external charger 200. The second plug 224 is connected to the charging port 80.

The charging cable 220 includes a signal cable and an electric power cable used for supplying of the electric power described above. The electric power supplied from the charge/discharge device 200 is supplied to the charging port 80 via the electric power cable. The electric power supplied from the battery 40 to the charging port 80 is supplied to the charge/discharge device 200 via the electric power cable. The signal cable mediates communications performed between the vehicle 10 and the charge/discharge device 200. Accordingly, an electric power connector and a signal connector are provided on each of the first plug 222 and second plug 224.

The converter 82 is provided between the battery 40 and the charging port 80. The converter 82 converts a current (for example, an alternate current) introduced from the charge/discharge device 200 via the charging port 80 into a direct current. The converter 82 outputs the converted direct current to the battery 40. The converter 82 converts a current (for example, a direct current) introduced from the battery 40 into an alternate current. The converter 82 outputs the converted alternate current to the charging port 80.

[Management Apparatus]

Hereinafter, a configuration of the management apparatus 100 is described.

As shown in FIG. 1, the management apparatus 100 includes, for example, a communication part 110, an acquisition part 120, a management part 130, and a storage part 140.

The acquisition part 120 and the management part 130 are realized, for example, by a hardware processor such as a CPU (Central Processing Unit) executing a program (software). Some or all of these constituent elements may be realized by hardware (a circuit part including circuitry) such as a LSI (Large-Scale Integration), an ASIC (Application-Specific Integrated Circuit), a FPGA (Field-Programmable Gate Array), or a GPU (Graphics-Processing Unit) or may be realized by cooperation of software and hardware. The program may be stored in a storage device (a storage device that includes a non-transitory storage medium) such as a HDD (Hard Disk Drive) or a flash memory of the management apparatus 100 in advance. Alternatively, the program may be stored in a detachable storage medium (non-transitory storage medium) such as a DVD (Digital Versatile Disc) or a CD-ROM (Compact Disc Read-Only Memory) and may be installed in the HDD, the flash memory, or the like of the management apparatus 100 by the storage medium being mounted to a drive device.

The communication part 110 includes, for example, a communication interface such as a NIC (Network Interface Card). The communication part 110 transmits and receives information between the management apparatus 100 and the plurality of charge/discharge devices 200, between the management apparatus 100 and the electric utility company that manages the electric power system 400, and between the management apparatus 100 and the terminal 500 via the network NW. The network NW includes, for example, the Internet, a WAN (Wide Area Network), a LAN (Local Area Network), a provider device, a wireless base station, and the like.

The communication part 110 receives the information output from each charge/discharge device 200. The information includes the SOC information (such as a voltage of the battery 40 of the vehicle 10 and the information indicating the SOC or the like), the assist electric power information, and the like. The acquisition part 120 causes the storage part 140 to store the information received by the communication part 110.

As shown in FIG. 1, for example, the terminal 500 held by a user of the vehicle 10 is wirelessly connected to the network NW. The terminal 500 is, for example, a small information terminal such as a smartphone or a tablet terminal. The user inputs use schedule information by using the terminal 500, for example, in a case where the use of the vehicle 10 is finished, and the charging cable 220 is connected to the charge/discharge device 200, or the like.

The use schedule information here is information indicating a time period in which the user is scheduled not to use the vehicle 10 in the future. The use schedule information is not limited thereto. The use schedule information may be, for example, information indicating a time period in which the user is scheduled to use the vehicle 10 in the future or may be information indicating a time when the user is scheduled to use the vehicle 10 next time. That is, the use schedule information may be arbitrary information as long as the use schedule information is information that is able to specify a time period in which the user will not use the vehicle 10 in the future or a time period in which the user is unlikely to use the vehicle 10 in the future. A timing when the user inputs the use schedule information is not limited to a timing immediately after the use of the vehicle 10 and may be an arbitrary timing.

FIG. 4 shows an example of the use schedule information according to the first embodiment. As shown in the drawing, the use schedule information is, for example, data in which a "vehicle ID" and a "non-use time period" are associated with each other. The use schedule information shown in FIG. 4 indicates that, for example, the vehicle 10 having the vehicle ID of "c0001" is scheduled not to be used in a time period from 18:00 on Oct. 1, 2019 to 7:00 on Oct. 2, 2019. In the use schedule information shown in FIG. 4, only one non-use time period is associated with one vehicle ID; however, the embodiment is not limited thereto. A plurality of non-use time periods may be associated with one vehicle ID. That is, the user may input a plurality of time periods in which the user is scheduled not to use the vehicle 10 in the future together, and the plurality of use schedule information with respect to one vehicle 10 may be registered in the management apparatus 100.

The communication part 110 of the management apparatus 100 receives the use schedule information transmitted from the terminal 500. The acquisition part 120 causes the storage part 140 to store the use schedule information received by the communication part 110.

The user may input the use schedule information by using a device other than the small information terminal (terminal 500). For example, the user may input the use schedule information by using an information processing device such as a personal computer (PC) provided in the user's home. Alternatively, for example, the vehicle 10 may include an input device, and the user may input the use schedule information by using the input device included in the vehicle 10. In this case, the input device may be an input/output device (for example, a touch panel or the like) integrated with the display device 70 shown in FIG. 2. Alternatively, the input device may be a device integrated with a car navigation system.

The management part 130 performs a control that distributes electric power among the vehicle 10, the building 410, and the electric power system 400. The management part 130 supplies the electric power, which is supplied from the vehicle 10 to the electric power system 400, to the electric power plant that constitutes the electric power system 400 and the building 410 connected to the electric power system 400. Alternatively, the management part 130 supplies the electric power, which is supplied from the electric power system 400, to the vehicle 10 connected to the charge/discharge device 200.

The management part 130 controls the supply of electric power from the vehicle 10 to the electric power system 400 by the V2G. Specifically, the management part 130 predicts a time period in which the stored electric power amount is insufficient, and the amount of shortage of electric power in the electric power system 400. The prediction is performed by an arbitrary prediction method. For example, the time period in which the stored electric power amount is insufficient and the amount of shortage of electric power are predicted on the basis of past transition of electric power demand.

The management part 130 stores, in the storage part 140 in advance, information (hereinafter, referred to as "registration information list") that indicates the vehicle 10 registered to participate in the V2G. The registration information list is, for example, a list of vehicle IDs. When participating in the V2G, the user registers, in the management apparatus 100 in advance, information (hereinafter, referred to as "registration information") indicating the vehicle 10 registered in the V2G such as, for example, the vehicle ID. The registration information is information indicating the user's approval of use of the electric power stored in the battery 40 mounted on the vehicle 10.

The management part 130 identifies a vehicle 10 (a first vehicle) registered to participate in the V2G on the basis of the registration information list stored in the storage part 140 among the vehicles 10 connected to the charge/discharge device 200. The management part 130 specifies the stored electric power amount (for example, in the predicted time period) of the battery 40 mounted on the identified vehicle 10 on the basis of the assist electric power information stored in the storage part 140. The management part 130 calculates an electric power amount of the electric power that can be supplied to the electric power system 400 from the identified vehicle 10 on the basis of the specified stored electric power amount.

The management part 130 determines a supply amount of electric power supplied to the electric power system 400 from at least one vehicle 10 on the basis of the calculation result described above for each vehicle 10. The management part 130 then performs a control such that the electric power of the determined supply amount is supplied to the electric power system 400 from the determined at least one vehicle 10 when the time elapses and is in the predicted time period in which the stored electric power amount in the electric power system 400 is insufficient.

The management part 130 may determine the supply amount of the electric power supplied from the at least one vehicle 10 to the electric power system 400 for each vehicle 10 on the basis of the registration information list and the use schedule information stored in the storage part 140. In this case, the management part 130 first identifies the vehicle 10 registered to participate in the V2G on the basis of the registration information list among the vehicles 10 connected to the charge/discharge device 200. Next, the management part 130 identifies a vehicle 10 (a second vehicle) which is scheduled not to be used in the predicted time period among the identified vehicles 10 on the basis of the use schedule information. The management part 130 specifies the stored electric power amount (for example, in the predicted time period) of the battery 40 mounted on the identified vehicle 10 on the basis of the assist electric power information. The management part 130 calculates an electric power amount of the electric power that can be supplied to the electric power system 400 from the identified vehicle 10 on the basis of the specified stored electric power amount. The management part 130 determines a supply amount of electric power supplied to the electric power system 400 from at least one vehicle 10 on the basis of the calculation result described above for each vehicle 10. The management part 130 then performs a control such that the electric power of the determined supply amount is supplied to the electric power system 400 from the determined at least one vehicle 10 when the time elapses and is in the predicted time period in which the stored electric power amount in the electric power system 400 is insufficient.

The storage part 140 is implemented, for example, by a HDD, a flash memory, an EEPROM (Electronically-Erasable Programmable Read-Only Memory), a ROM (Read-Only Memory), a RAM (Random-Access Memory), or the like. The storage part 140 stores, for example, the SOC information, the assist electric power information, the use schedule information, other information, and the like.

[Charge/Discharge Device]

Hereinafter, a configuration of the charge/discharge device 200 is described.

As shown in FIG. 1, the charge/discharge device 200 includes a control device 204 and a cable connection port 208.

The control device 204 can communicate with the vehicle 10, the management apparatus 100, the electric utility company that manages the electric power system 400, and the like via the network NW. The control device 204 controls the exchange of electric power between the electric power system 400 and the charge/discharge device 200 on the basis of input information from an input device (not shown) provided outside the housing of the control device 204, information provided from the vehicle 10, the management apparatus 100, and the electric utility company, and the like.

The cable connection port 208 is formed to open on an outer surface of the housing of the control device 204. The charging cable 220 is connectable to the cable connection port 208.

The charging cable 220 includes the first plug 222 and the second plug 224. The first plug 222 is connected to the cable connection port 208 of the charge/discharge device 200. The second plug 224 is connected to the charging port 80 of the vehicle 10.

When the vehicle 10 is connected to the charge/discharge device 200, the control device 204 detects connection of the vehicle 10 and outputs a detection signal to the management apparatus 100 via the network NW.

The detection signal includes, for example, identification information (ID) of the charge/discharge device 200 and the like. The management apparatus 100 identifies a charge/discharge device 200 to which the vehicle 10 is connected from among the plurality of charge/discharge devices 200 connected to the electric power system 400 on the basis of the detection signal acquired via the network NW from the charge/discharge device 200.

[Example of Electric Power Supply by Vehicle Electric Power Source Control System]

Hereinafter, an example of the electric power supply by the vehicle electric power source control system 1 according to the present embodiment is described with reference to FIG. 1 to FIG. 5.

For example, the user parks the vehicle 10 in a parking area at the user's home after using the vehicle 10 as a transportation means. The user connects the second plug 224 included in the charge/discharge device 200 installed in the parking area to the charging port 80 of the vehicle 10.

When the charge/discharge device 200 and the vehicle 10 are connected together, the supply (charging) of electric power from the electric power system 400 to the battery 40 included in the vehicle 10 is started via the electric power cable included in the charging cable 220. When the charge/discharge device 200 and the vehicle 10 are connected together, the SOC information and the assist electric power information are transmitted from the vehicle 10 to the management apparatus 100 via the signal cable included in the charging cable 220, the charge/discharge device 200, and the network NW. The assist electric power information transmitted here includes a vehicle ID of "c0001", the stored electric power amount, and information indicating a discharge mode of "100 sec and 50 kW", "10 sec and 70 kW", and "1 sec and 100 kW" as shown in FIG. 3. The management apparatus 100 causes the storage part 140 to store a variety of information described above received from the vehicle 10.

The user inputs the use schedule information by using the terminal 500 after using the vehicle 10 as a transportation means. For example, the user inputs information indicating "from 18:00 on Oct. 1, 2019 to 7:00 on Oct. 2, 2019" as a time period in which the user is scheduled not to use the vehicle 10 in the future by using the terminal 500. The input use schedule information is transmitted from the terminal 500 to the management apparatus 100 via the network NW. The management apparatus 100 causes the storage part 140 to store the use schedule information received from the terminal 500.

Similarly, a variety of information of another vehicle 10 (for example, a vehicle 10 having a vehicle ID of "c0002" to "c0004" or the like) which is not shown in FIG. 1 is collected via the charge/discharge device 200, and thereby, the assist electric power information shown in FIG. 3, the registration information list, and the use schedule information shown in FIG. 4 are stored in the storage part 140 of the management apparatus 100.

The management part 130 of the management apparatus 100 controls the supply of electric power from the vehicle 10 to the electric power system 400 by the V2G. The management part 130 predicts a time period in which the stored electric power amount is insufficient, and the amount of shortage of electric power in the electric power system 400. As described above, the management part 130 predicts the time period and the electric power amount described above, for example, on the basis of past transition of the demand amount of electric power or the like.

The management part 130 identifies the vehicle 10 that is registered to participate in the V2G on the basis of the registration information list stored in the storage part 140 among the vehicles 10 connected to the charge/discharge device 200. For example, it is assumed that the vehicles 10 of vehicle IDs of "c0001", "c0003", "c0004", and the like are registered to participate in V2G. The management part 130 specifies the stored electric power amount (for example, in the predicted time period) of the battery 40 mounted on the identified vehicle 10 on the basis of the assist electric power information stored in the storage part 140.

The management part 130 calculates an electric power amount of the electric power that can be supplied to the electric power system 400 from the identified vehicle 10 on the basis of the specified stored electric power amount. A calculation method in this case may be, for example, a method in which the management part 130 calculates the electric power amount of the electric power that can be supplied to the electric power system 400 from the vehicle 10 by subtracting a predetermined electric power amount from the specified stored electric power amount. In this case, the predetermined electric power amount may be set, for example, to an electric power amount consumed when traveling an average travel distance per day of the vehicle 10 or the like.

The management part 130 determines at least one vehicle 10 that supplies electric power to the electric power system 400 on the basis of the calculation result described above such that the supply amount can compensate the predicted amount of shortage of electric power in the electric power system 400, and determines a supply amount of electric power for each selected vehicle 10. The management part 130 then performs a control such that the electric power of the determined supply amount is supplied from the determined at least one vehicle 10 to the electric power system 400 when the time is in the time period in which the stored electric power amount is insufficient in the electric power system 400.

The management part 130 may control the supply of electric power on the basis of the registration information list and the use schedule information stored in the storage part 140. In this case, the management part 130 first identifies the vehicle 10 that is registered to participate in the V2G on the basis of the registration information list.

Figure 5:
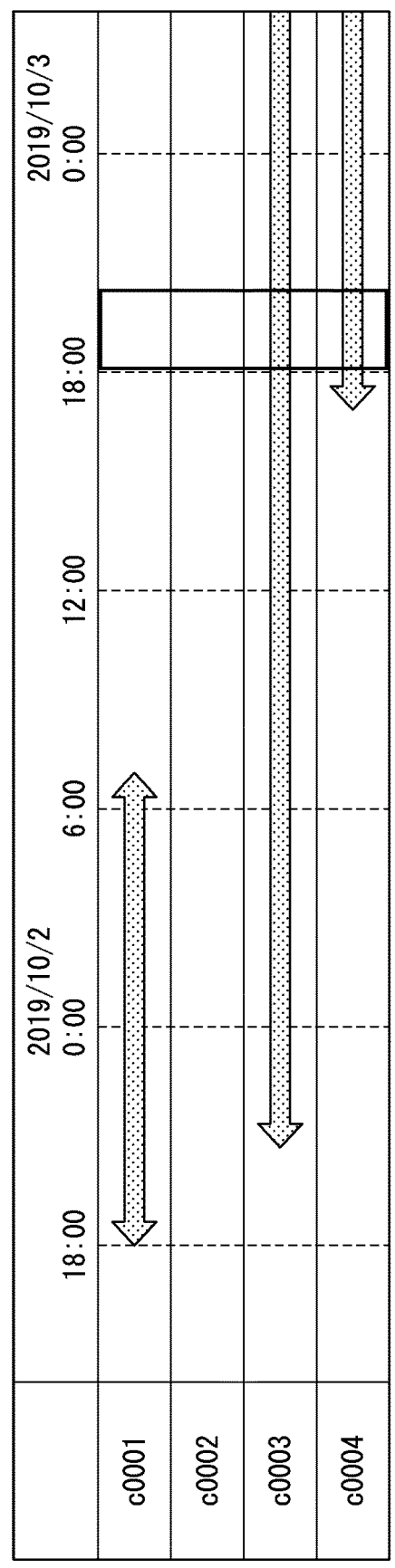
FIG. 5 is a view showing an example of selecting a vehicle by a management part according to the first embodiment.

Next, the management part 130 identifies a vehicle 10 which is scheduled not to be used in the predicted time period among the identified vehicles 10 on the basis of the use schedule information. For example, the use schedule information shown in FIG. 4 can be represented as in FIG. 5. FIG. 5 is a view showing an example of selecting a vehicle by the management part 130 according to the first embodiment. As shown in FIG. 5, for example, in a case where the predicted time period in which the stored electric power amount is insufficient in the electric power system 400 is between 18:00 and 20:00 on Oct. 2, 2019, the management part 130 can identify a vehicle 10 having a vehicle ID of "c0003" and "c0004" as a vehicle that is scheduled not to be used in that time period.

The management part 130 specifies the stored electric power amount (for example, in the predicted time period) of the battery 40 mounted on the identified vehicle 10 on the basis of the assist electric power information stored in the storage part 140. The management part 130 calculates an electric power amount of the electric power that can be supplied to the electric power system 400 from the identified vehicle 10 on the basis of the specified stored electric power amount. The management part 130 determines at least one vehicle 10 that supplies electric power to the electric power system 400 on the basis of the calculation result described above such that the supply amount can compensate the predicted amount of shortage of electric power in the electric power system 400, and determines a supply amount of electric power for each selected vehicle 10. The management part 130 then performs a control such that the electric power of the determined supply amount is supplied from the determined at least one vehicle 10 to the electric power system 400 when the time is in the time period in which the stored electric power amount is insufficient in the electric power system 400.

The management part 130 may determine a vehicle 10 in consideration of a discharge mode which the vehicle 10 can deal with when determining the vehicle 10 that supplies electric power to the electric power system 400. For example, it is assumed that the discharge mode required in the electric power system 400 is "10 sec and 70 kW" and the assist electric power information held by the management part 130 is that shown in FIG. 3. In this case, the management part 130 determines a vehicle 10 that supplies electric power to the electric power system 400 from among the vehicles 10 of vehicle IDs of "c0001", "c0003", and "c0004".

[Operation of Management Apparatus]

Hereinafter, an example of an operation of the management apparatus 100 is described.

Figure 6:
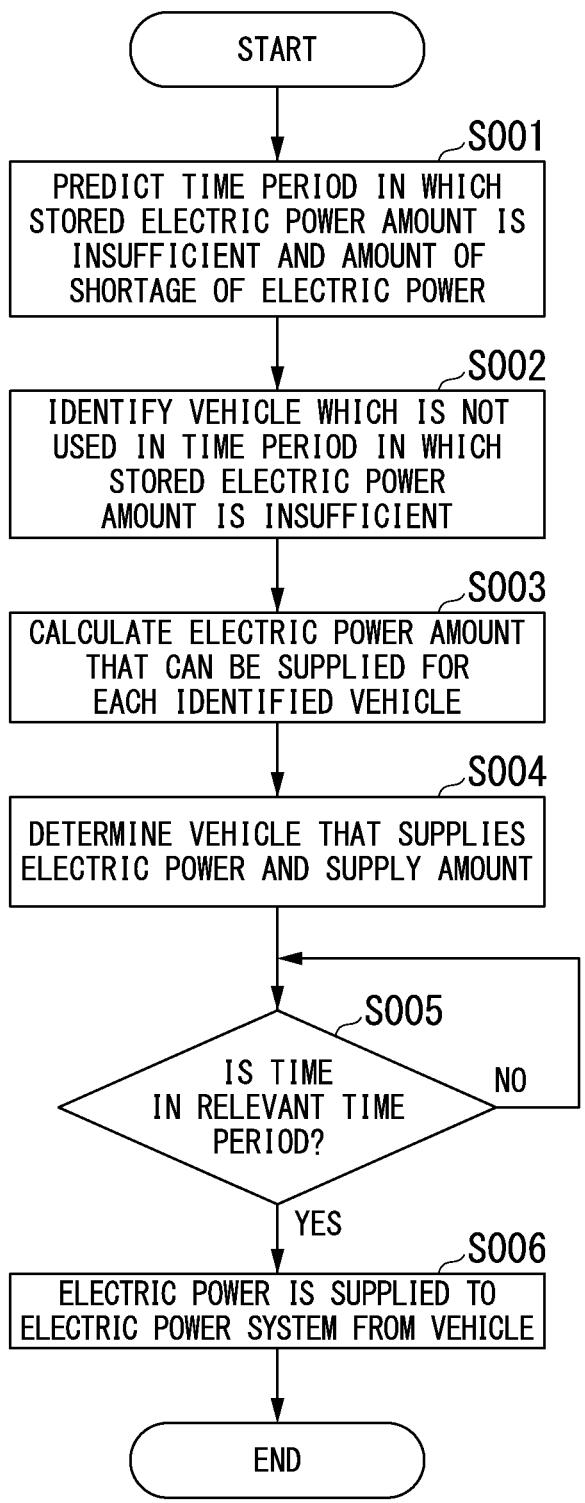
FIG. 6 is a flowchart showing an example of an operation of a management apparatus according to the first embodiment.

FIG. 6 is a flowchart showing an example of an operation of the management apparatus 100 according to the first embodiment. The operation of the management apparatus 100 shown in the present flowchart is started, for example, periodically (for example, every hour).

The management part 130 predicts a time period in which the stored electric power amount is insufficient, and the amount of shortage of the electric power in the electric power system 400, for example, on the basis of transition of the demand amount of electric power in the past or the like (Step S001). The management part 130 identifies the vehicle 10 that is registered to participate in the V2G on the basis of the registration information list stored in the storage part 140 among the vehicles 10 connected to the charge/discharge device 200 (Step S002).

The management part 130 calculates an electric power amount of electric power that can be supplied from the vehicle 10 to the electric power system 400 for each vehicle 10 identified in Step S002 (Step S003). The management part 130 determines a vehicle 10 that supplies electric power to the electric power system 400 on the basis of the calculation result of the electric power amount in Step S003, and determines a supply amount of the electric power for each determined vehicle 10 (Step S004).

The management part 130 waits until the time is in the predicted time period in which the stored electric power amount is insufficient in the electric power system 400 predicted in Step S001. When the time is in the time period (Step S005—Yes), the management part 130 performs a control such that the electric power of the supply amount determined in Step S004 is supplied to the electric power system 400 from the vehicle 10 determined in Step S004 (Step S006). Thus, the operation of the management apparatus 100 shown in the flowchart of FIG. 6 is completed.

As described above, the management apparatus 100 according to the first embodiment controls charging and discharging between the electric power system 400 and the battery 40 (secondary battery) which is mounted on the vehicle 10 and which stores electric power used for traveling of the vehicle 10. The management apparatus 100 includes the acquisition part 120 that acquires the registration information indicating that the vehicle 10 is registered to participate in the V2G and the management part 130 that controls the supply of electric power from the battery 40 to the electric power system 400 depending on the presence or absence of the registration information. The management part 130 identifies a vehicle 10 in a non-use time period, for example, on the basis of the use schedule information indicating whether or not the vehicle 10 is scheduled to be used, and supplies electric power to the electric power system 400 from the battery 40 mounted on the identified vehicle 10.

By including such a configuration, the management apparatus 100 according to the first embodiment is able to allow the battery 40 of the vehicle 10 which is registered to participate in the V2G and which is scheduled not to be used to function as if the battery 40 is one of electric power storage facilities in the commercial utility grid, for example, when the stored electric power amount in the electric power system 400 is insufficient or the like. Thereby, the management apparatus 100 is able to efficiently use the battery 40 mounted on the vehicle 10.

MODIFIED EXAMPLE

Hereinafter, a modified example of the first embodiment is described.

In the first embodiment described above, the management part 130 of the management apparatus 100 identifies the vehicle 10 registered to participate in the V2G and specifies the stored electric power amount of the battery 40 mounted on the vehicle 10 that is scheduled not to be used in the relevant time period on the basis of the registration information list stored in the storage part 140 and the assist electric power information. The management part 130 calculates an electric power amount of electric power that can be supplied from the vehicle 10 to the electric power system 400 on the basis of the specified stored electric power amount. Here, in the first embodiment described above, the management part 130 calculates the electric power amount of the electric power that can be supplied to the electric power system 400 from the vehicle 10 by subtracting a predetermined electric power amount from the specified stored electric power amount. However, in this case, there is a possibility that sufficient electric power for using the vehicle 10 as the transportation means again at a time point when the use of the vehicle 10 may start again after the time period in which the vehicle 10 is scheduled not to be used elapses.

On the other hand, the management part 130 of the management apparatus 100 according to the modified example of the first embodiment performs a control such that the charging to the maximum stored electric power amount of the battery 40 is completed by the time when the use of the vehicle 10 starts again. That is, the management part 130 performs a control such that even if electric power is supplied from the vehicle 10 to the electric power system 400, the battery 40 is then charged to the maximum stored electric power amount before the time when the use of the vehicle 10 may start again. Specifically, the management part 130 determines a supply amount of the electric power supplied from the vehicle 10 to the electric power system 400 to the extent that a period of time in which the battery 40 is charged to the maximum stored electric power amount remains. The management part 130 may determine the supply amount of the electric power supplied from the vehicle 10 to the electric power system 400 to the extent that a period of time in which the battery 40 is charged not to the maximum stored electric power amount described above but a predetermined electric power amount sufficient for using the vehicle 10 remains.

Specifically, the management part 130 of the management apparatus 100 acquires, for example, from an external device or the like in advance, information indicating the maximum stored electric power amount of the battery 40 mounted on the vehicle 10 and a charging speed (for example, an electric power amount that can be charged per a given time) in the charging to the battery 40 by the charge/discharge device 200. For example, the management apparatus 100 may acquire this information from the vehicle 10 and the charge/discharge device 200 via the network NW. The management part 130 determines the time to stop the supply of electric power from the vehicle 10 to the electric power system 400 on the basis of the maximum stored electric power amount of the battery 40, the charging rate, and a remaining time until a time when the vehicle 10 may be used again. The management part 130 determines the electric power amount that can be supplied by the determined time as the supply amount of the electric power supplied from the vehicle 10 to the electric power system 400.

As described above, the management part 130 of the management apparatus 100 according to the modified example of the first embodiment determines a supply amount of the electric power supplied to the electric power system 400 from the battery 40 (secondary battery) mounted on the vehicle 10 in accordance with a use start schedule timing of the vehicle 10 that is scheduled not to be used in the relevant time period indicated by the use schedule information. The management part 130 determines the supply amount such that an electric power amount of the electric power stored in the battery 40 is equal to or more than a maximum stored electric power amount or a predetermined electric power amount at the use start schedule timing in a case where the electric power is supplied (in a case where charging is performed) from the electric power system 400 to the battery 40 when the electric power is not supplied to the electric power system 400 from the battery 40 mounted on the vehicle 10 that is scheduled not to be used in the relevant time period.

By including such a configuration, the management apparatus 100 according to the modified example of the first embodiment is able to perform a control such that sufficient electric power is stored in the battery 40 at a time point when the vehicle 10 is used as a transportation means again while efficiently using the battery 40 mounted on the vehicle 10.

Second Embodiment

Hereinafter, a second embodiment is described.

In the first embodiment and the modified example of the first embodiment described above, one embodiment of the management part 130 of the management apparatus 100 identifies a vehicle 10 that is scheduled not to be used in the relevant time period on the basis of the use schedule information stored in the storage part 140. The management part 130 then determines a vehicle 10 that supplies electric power to the electric power system 400 from among the identified vehicles 10 scheduled not to be used in the relevant time period. However, in this case, for example, if there are many users who do not input the use schedule information although the vehicle 10 is not used, there is a possibility that the supply amount of the electric power supplied to the electric power system 400 becomes insufficient.

On the other hand, the management part 130 of the management apparatus 100 according to the second embodiment selects, as a candidate of the vehicle 10 that supplies electric power to the electric power system 400, not only the vehicle 10 (the second vehicle) which is scheduled not to be used in the relevant time period but also a vehicle 10 (a third vehicle) for which the use schedule information is not input, or for which the use schedule information is input but which may be used in the relevant time period.

Specifically, the management part 130 determines the vehicle 10 that supplies electric power to the electric power system 400 and determines a supply amount of the electric power for each determined vehicle 10, for example, by performing a process similar to the first embodiment or a process similar to the modified example of the first embodiment described above with respect to the vehicle 10 for which the use schedule information is input and which is scheduled not to be used in the relevant time period.

On the other hand, a vehicle 10 for which the use schedule information is not input, or a vehicle 10 which may be used in the relevant time period and which has not yet been used as a transportation means (in a state of being connected to the charge/discharge device 200) may be immediately used as a transportation means. Therefore, the management part 130 of the management apparatus 100 according to the second embodiment determines the vehicle 10 that supplies electric power to the electric power system 400 and determines the supply amount of electric power for each determined vehicle 10 when satisfying a condition that the stored electric power amount stored in the battery 40 is maintained to be equal to or more than a predetermined electric power amount with respect to the vehicle 10 for which the use schedule information is not input and the vehicle 10 which may be used in the relevant time period.

Here, the predetermined electric power amount is an electric power amount that is sufficient for using the vehicle 10 as a transportation means. The electric power amount sufficient for using the vehicle 10 as a transportation means may be determined, for example, on the basis of history information indicating a history in which the vehicle 10 is used as a transportation means in the past. In this case, the acquisition part 120 of the management apparatus 100 acquires the history information in advance, for example, from an external device or the like, and stores the history information in the storage part 140. The management part 130 determines the supply amount of electric power supplied from the vehicle 10 to the electric power system 400 on the basis of the history information stored in the storage part 140.

As described above, the management part 130 of the management apparatus 100 according to the second embodiment supplies the electric power to the electric power system 400 from the battery 40 while maintaining that the electric power amount of the electric power stored in the battery 40 (secondary battery) mounted on the vehicle 10 is equal to or more than the predetermined electric power amount with respect to the vehicle 10 which is not in a non-use time period (which may be used as a transportation means) on the basis of the use schedule information. The acquisition part 120 of the management apparatus 100 according to the second embodiment acquires, for example, history information indicating a past use history of the vehicle 10 which is not in a non-use time period (which may be used as a transportation means), and the management part 130 determines the predetermined electric power amount on the basis of the history information.

By including such a configuration, the management apparatus 100 according to the second embodiment can prevent the occurrence of supply shortage of electric power supplied to the electric power system 400, for example, even when there are many users who do not use the vehicle 10 and do not input the use schedule information, while efficiently using the battery 40 mounted on the vehicle 10.

Third Embodiment

Hereinafter, a third embodiment is described.

The vehicle electric power source control system 1 according to the first embodiment and the second embodiment described above aims at utilizing the electric power stored in the battery 40 mounted on the vehicle 10 in response to the shortage of the electric power stored in the electric power system 400 including the commercial utility grid caused by the variation of the electric power demand depending on, for example, a season, a time period, and the like. That is, the electric power stored in the battery 40 mounted on the vehicle 10 is utilized in response to an electric power request (hereinafter, referred to as an "ordinary electric power request") based on the general demand variation. However, it is conceivable that the battery 40 mounted on the vehicle 10 is utilized not only aiming at responding to such an ordinary electric power request but also aiming at an electric power request (hereinafter, referred to as a "disaster support request") for the use as an emergency electric power source, for example, in a time of emergency such as a power failure and natural disaster or the like.

The vehicle electric power source control system 1 according to the third embodiment may change the determination of the vehicle 10 that supplies electric power to the electric power system 400 and the determination of the supply amount of electric power, respectively, depending on the use application of electric power. In the present embodiment, the use application of electric power of the battery 40 mounted on the vehicle 10 includes a use application (hereinafter, referred to as an "ordinary use application") for compensating the shortage of electric power due to the general demand variation by a season, a time period, and the like, and a use application (hereinafter, referred to as an "emergency use application") for ensuring electric power required in a time of emergency such as a power failure and natural disaster. The use applications are examples and may be another use application. The number of use applications is not limited to two and may be three or more.

In general, an electric power supply performed in the emergency use application requires more emergency and reliability than an electric power supply performed in the ordinary use application. Therefore, the management part 130 of the management apparatus 100 according to the third embodiment performs the process similar to the first embodiment or the process similar to the modified example of the first embodiment described above when the use application of electric power is the ordinary use application. That is, the management part 130 supplies electric power to the electric power system 400 from the vehicle 10 which is registered to participate in the V2G, for which the use schedule information is input, and which is scheduled not to be used in the relevant time period.

On the other hand, the management part 130 performs, for example, the process similar to the second embodiment described above when the use application of electric power is the emergency use application. That is, the management part 130 not only supplies electric power to the electric power system 400 from the vehicle 10 for which the use schedule information is input and which is scheduled not to be used in the relevant time period but also selects, as a candidate of the vehicle 10 that supplies electric power to the electric power system 400, the vehicle 10 for which the use schedule information is not input and the vehicle 10 which may be used in the relevant time period.

In this case, similarly to the second embodiment described above, the management part 130 supplies electric power to the electric power system 400 from the vehicle 10 to the extent that the stored electric power amount in the battery 40 is maintained to the predetermined electric power amount regarding the vehicle 10 for which the use schedule information is not input and the vehicle 10 which may be used in the relevant time period. Here, the predetermined electric power amount is an electric power amount sufficient for using the vehicle 10 as a transportation means.

FIG. 7 is a conceptual view showing the contents of a process performed by the management apparatus 100 according to the third embodiment. The contents of the process shown in FIG. 7 are merely examples.

As shown in FIG. 7, the management part 130 of the management apparatus 100 changes the process contents on the basis of whether or not the vehicle 10 is a vehicle registered to participate in the V2G. The management part 130 changes the process contents on the basis of whether or not the vehicle 10 is a vehicle in which a time period requiring an electric power supply to the electric power system 400 is set as a non-use time period when the participation in the V2G is registered. That is, the management part 130 changes the process contents on the basis of whether the vehicle 10 is not scheduled to be used or may be used in the relevant time period.

The management part 130 changes the process contents on the basis of whether a request of the electric power supply to the electric power system 400 is a disaster support request or is the ordinary electric power request. That is, the management part 130 changes the process contents on the basis of whether the application is the emergency use application or is the ordinary use application.

Figure 8:
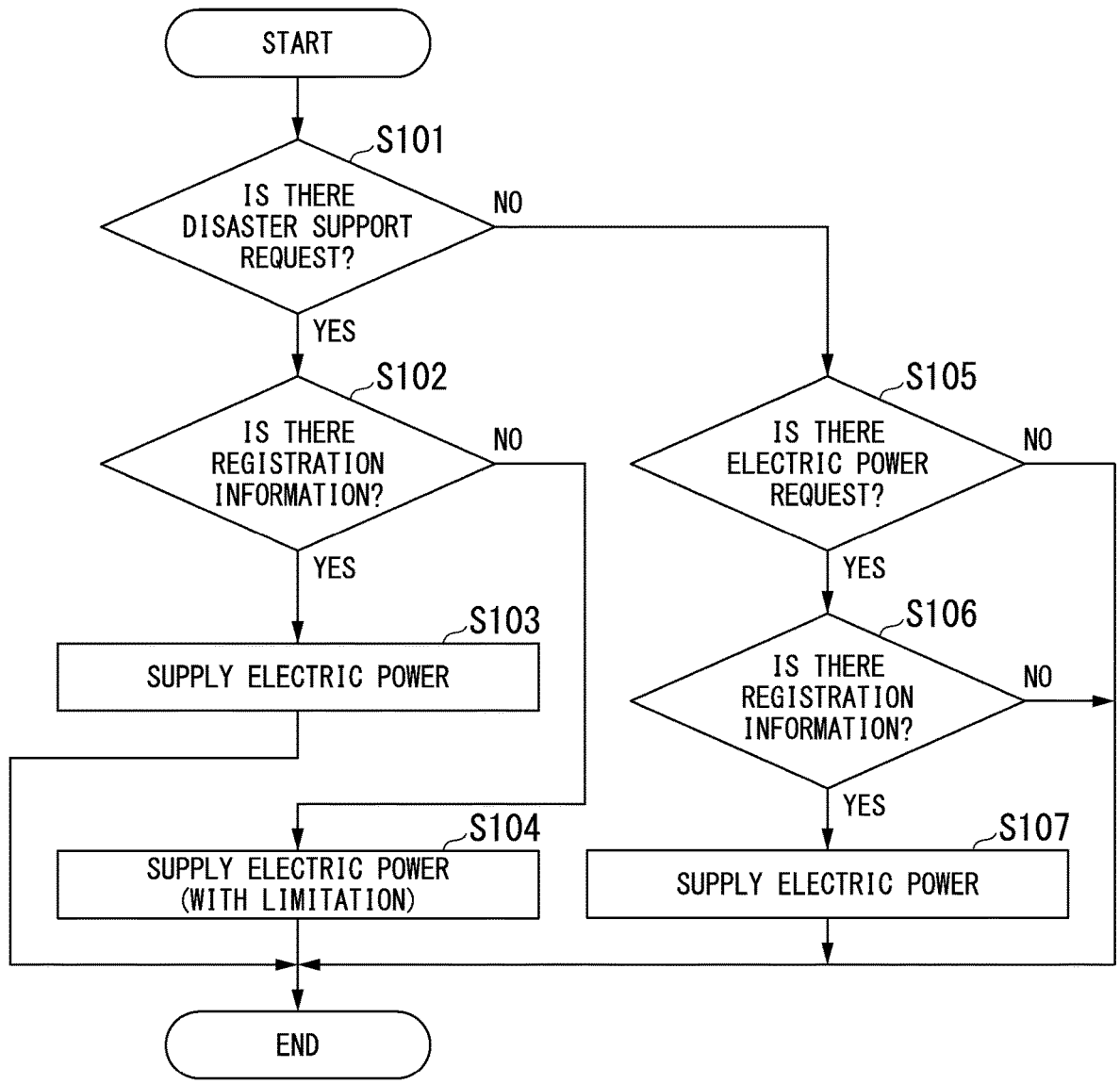
FIG. 8 is a flowchart showing an example of an operation of the management apparatus according to the third embodiment.

In accordance with the process contents shown in the conceptual view of FIG. 7, the management apparatus 100 performs, for example, a process shown in FIG. 8. FIG. 8 is a flowchart showing an example of an operation of a management apparatus 100 according to the third embodiment.

For example, the management part 130 confirms whether or not there is registration information (relating to participation in the V2G) of the vehicle 10 connected to the charge/discharge device 200 with reference to the registration information list when receiving a disaster support request (Step S101—yes) (Step S102). When there is registration information (Step S102—yes), the management part 130 makes the vehicle 10 a candidate for the vehicle 10 that supplies electric power to the electric power system 400 (Step S103). On the other hand, when there is no registration information (Step S102—no), the management part 130 makes the vehicle 10 a candidate for the vehicle 10 that supplies electric power to the electric power system 400 with a limitation (Step S104).

The limitation herein is, for example, that when the management part 130 causes the vehicle 10 to supply electric power to the electric power system 400, the stored electric power amount stored in the battery 40 is maintained to a predetermined electric power amount or more.

On the other hand, for example, the management part 130 confirms whether or not there is registration information of the vehicle 10 connected to the charge/discharge device 200 with reference to the registration information list when receiving an ordinary electric power request (Step S105—yes) (Step S106). When there is registration information (Step S106—yes), the management part 130 makes the vehicle 10 a candidate for the vehicle 10 that supplies electric power to the electric power system 400 (Step S107). On the other hand, when there is no registration information (Step S106—no), the management part 130 does not include the vehicle 10 in a candidate for the vehicle 10 that supplies electric power to the electric power system 400. Thus, the process of the management part 130 shown in the flowchart of FIG. 8 is completed.

Figure 9:
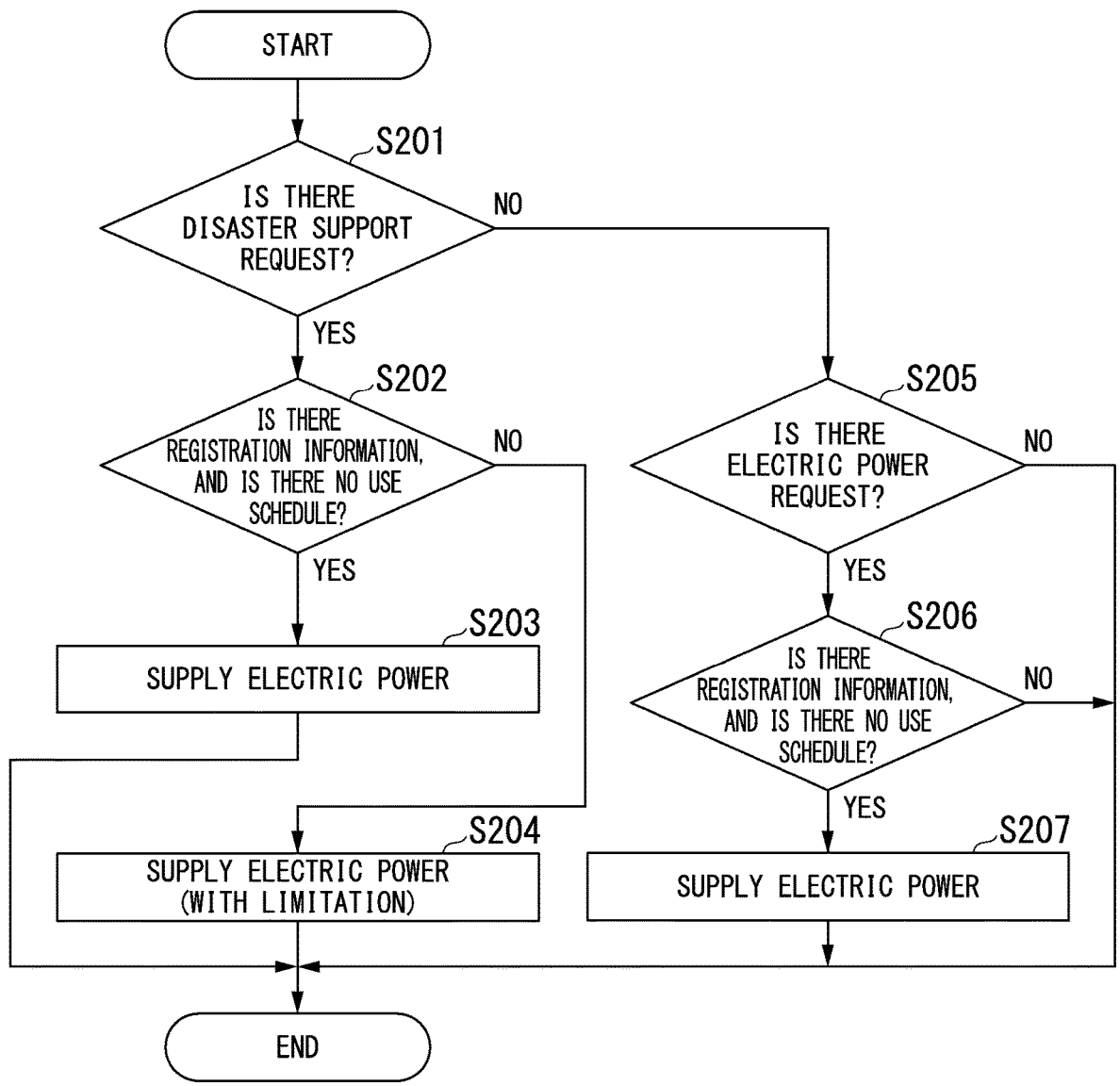
FIG. 9 is a flowchart showing another example of the operation of the management apparatus according to the third embodiment.

Alternatively, the management apparatus 100 may perform, for example, a process shown in FIG. 9. FIG. 9 is a flowchart showing another example of an operation of the management apparatus 100 according to the third embodiment. The processes of Step S201, Steps S203 to S205, and Step S207 of FIG. 9 are similar to the processes of Step S101, Steps S103 to S105, and Step S107 of FIG. 8. That is, FIGS. 8 and 9 differ from each other only in that Step S102 is changed to Step S202 and Step S106 is changed to Step S206.

For example, the management part 130 confirms whether or not there is registration information (relating to participation in the V2G) of the vehicle 10 connected to the charge/discharge device 200 with reference to the registration information list when receiving a disaster support request (Step S201—yes). When there is registration information, the management part 130 further confirms whether or not the vehicle 10 is scheduled to be used with reference to use schedule information. When there is registration information and the vehicle 10 is scheduled not to be used (Step S202—yes), the management part 130 makes the vehicle 10 a candidate for the vehicle 10 that supplies electric power to the electric power system 400 (Step S203). On the other hand, when there is no registration information or the vehicle 10 may be used (Step S202—no), the management part 130 makes the vehicle 10 a candidate for the vehicle 10 that supplies electric power to the electric power system 400 with a limitation (Step S204). The limitation herein is as described above.

On the other hand, for example, the management part 130 confirms whether or not there is registration information of the vehicle 10 connected to the charge/discharge device 200 with reference to the registration information list when receiving an ordinary electric power request (Step S205—yes). When there is registration information, the management part 130 further confirms whether or not the vehicle 10 is scheduled to be used with reference to use schedule information. When there is registration information and the vehicle 10 is scheduled not to be used (Step S206—yes), the management part 130 makes the vehicle 10 a candidate for the vehicle 10 that supplies electric power to the electric power system 400 (Step S207). On the other hand, when there is no registration information or the vehicle 10 may be used (Step S206—no), the management part 130 does not include the vehicle 10 in a candidate for the vehicle 10 that supplies electric power to the electric power system 400. Thus, the process of the management part 130 shown in the flowchart of FIG. 9 is completed.

As described above, the management part 130 of the management apparatus 100 according to the third embodiment changes the determination of the vehicle 10 that supplies electric power to the electric power system 400 and the determination of the supply amount of the electric power depending on whether the use application of the electric power is the ordinary use application (first use application) or the use application is a use application (second use application) that is different from the ordinary application.

By including such a configuration, the management apparatus 100 according to the third embodiment can flexibly prioritize the utilization of the electric power stored in the battery 40 depending on the use application of the electric power. Thereby, the management apparatus 100 can efficiently use the battery 40 mounted on the vehicle 10 while flexibly determining a vehicle 10 that supplies electric power to the electric power system 400 and the supply amount of the electric power depending on the degree of priority.

Fourth Embodiment

The above embodiments are described using an example in which the vehicle 10 is an electric vehicle (EV). In this case, when the stored electric power amount stored in the battery 40 mounted on the vehicle 10 is not a sufficient electric power amount, the management part 130 of the management apparatus 100 cannot make the vehicle 10 a candidate for supplying electric power to the electric power system 400.

On the other hand, in the fourth embodiment, the vehicle 10 is, for example, a vehicle capable of generating electricity by an internal combustion engine such as a hybrid electric vehicle (HEV) or is, for example, a vehicle capable of generating electricity by a chemical reaction such as a fuel-cell vehicle (FCV). In this case, the management part 130 of the management apparatus 100 according to the fourth embodiment can increase the stored electric power amount of the battery 40 as needed by causing the vehicle 10 to generate electricity and charging the battery 40.

That is, if the vehicle 10 is, for example, a hybrid electric vehicle, the management part 130 increases the stored electric power amount of the battery 40 and ensures a required supply amount of the electric power by starting an engine of the vehicle 10 to perform electric power generation. If the vehicle 10 is, for example, a fuel-cell vehicle, the management part 130 increases the stored electric power amount of the battery 40 and ensures a required supply amount of the electric power by causing hydrogen and oxygen to chemically react with each other by a fuel cell to perform electric power generation.

By including such a configuration, the management apparatus 100 according to the fourth embodiment can increase the stored electric power amount, as needed, of a vehicle 10 in which the stored electric power amount of the battery 40 is insufficient and therefore can make the vehicle 10 a candidate for the vehicle 10 that supplies electric power to the electric power system 400. Thereby, the management apparatus 100 can efficiently use the battery 40 mounted on the vehicle 10 while preventing the occurrence of supply shortage of electric power supplied to the electric power system 400, for example, even when there are many users who do not use the vehicle 10 and do not input the use schedule information.

Although the embodiments of the present invention have been described in detail, the specific configuration is not limited to those described above, and various design changes and the like can be made without departing from the scope of the invention.

What is claimed is:

1. A management apparatus that controls charging and discharging between an electric power system and a secondary battery which is mounted on a vehicle and which stores electric power used for traveling of the vehicle, the management apparatus comprising:
    an acquisition part that acquires at least one of registration information indicating a use acceptance of the electric power and information indicating a use application of the electric power; and
    a management part that controls a supply of the electric power from the secondary battery to the electric power system in accordance with at least one of a presence or absence of the registration information and the use application of the electric power,
    wherein the management part performs a first control relating to a supply of the electric power to the electric power system from only the secondary battery having the registration information indicating the use acceptance of the electric power in a case where the use application of the electric power is a first use application, and
    the management part performs a second control relating to a supply of the electric power to the electric power system from the secondary battery regardless of the presence or absence of the registration information indicating the use acceptance of the electric power in a case where the use application of the electric power is a second use application.

2. The management apparatus according to claim 1, wherein the management part identifies a first vehicle indicating the vehicle for which the registration information is present and supplies the electric power to the electric power system from a secondary battery mounted on the first vehicle.

3. The management apparatus according to claim 2, wherein the acquisition part further acquires use schedule information indicating a use schedule of the vehicle, and
the management part identifies a second vehicle indicating a vehicle for which the registration information is present and which is in a non-use time period based on the registration information and the use schedule information and supplies the electric power to the electric power system from a secondary battery mounted on the second vehicle.

4. The management apparatus according to claim 3, wherein the management part determines a supply amount of the electric power supplied to the electric power system from the secondary battery mounted on the second vehicle in accordance with a use start schedule timing of the second vehicle indicated by the use schedule information.

5. The management apparatus according to claim 4, wherein in a case where the electric power is supplied from the electric power system to the secondary battery mounted on the second vehicle when the electric power is not supplied to the electric power system from the secondary battery mounted on the second vehicle, the management part determines a supply amount such that an electric power amount of the electric power stored in the secondary battery mounted on the second vehicle is equal to or more than a maximum stored electric power amount or a predetermined electric power amount at the use start schedule timing.

6. The management apparatus according to claim 3, wherein the management part identifies a third vehicle indicating the vehicle which is not in a non-use time period based on the use schedule information and supplies the electric power to the electric power system from the secondary battery mounted on the third vehicle such that an electric power amount of the electric power stored in a secondary battery mounted on the third vehicle is equal to or more than a predetermined electric power amount.

7. A management apparatus that controls charging and discharging between an electric power system and a secondary battery which is mounted on a vehicle and which stores electric power used for traveling of the vehicle, the management apparatus comprising:
    an acquisition part that acquires at least one of registration information indicating a use acceptance of the electric power and information indicating a use application of the electric power; and
    a management part that controls a supply of the electric power from the secondary battery to the electric power system in accordance with at least one of a presence or absence of the registration information and the use application of the electric power,
    wherein the acquisition part further acquires use schedule information indicating a use schedule of the vehicle, the management part identifies a third vehicle indicating the vehicle for which the registration information is present and which is not in a non-use time period based on the registration information and the use schedule information, the acquisition part acquires history information indicating a past use history of the third vehicle, the management part determines a predetermined electric power amount based on the history information, and the management part supplies the electric power to the electric power system from the secondary battery mounted on the third vehicle such that an electric power amount of the electric power stored in a secondary battery mounted on the third vehicle is equal to or more than the predetermined electric power amount.

8. A management method that controls charging and discharging between an electric power system and a secondary battery which is mounted on a vehicle and which stores electric power used for traveling of the vehicle, the management method including:

acquiring at least one of registration information indicating a use acceptance of the electric power and information indicating a use application of the electric power;

controlling a supply of the electric power from the secondary battery to the electric power system in accordance with at least one of a presence or absence of the registration information and or the use application of the electric power; and in the controlling, performing a first control relating to a supply of the electric power to the electric power system from only the secondary battery having the registration information indicating the use acceptance of the electric power in a case where the use application of the electric power is a first use application, and performing a second control relating to a supply of the electric power to the electric power system from the secondary battery regardless of the presence or absence of the registration information indicating the use acceptance of the electric power in a case where the use application of the electric power is a second use application.

9. A computer-readable non-transitory recording medium that includes a program causing a computer to execute:

controlling charging and discharging between an electric power system and a secondary battery which is mounted on a vehicle and which stores electric power used for traveling of the vehicle;

acquiring at least one of registration information indicating a use acceptance of the electric power and information indicating a use application of the electric power;

controlling a supply of the electric power from the secondary battery to the electric power system in accordance with at least one of a presence or absence of the registration information and the use application of the electric power; and in the controlling, performing a first control relating to a supply of the electric power to the electric power system from only the secondary battery having the registration information indicating the use acceptance of the electric power in a case where the use application of the electric power is a first use application, and performing a second control relating to a supply of the electric power to the electric power system from the secondary battery regardless of the presence or absence of the registration information indicating the use acceptance of the electric power in a case where the use application of the electric power is a second use application.

\* \* \* \* \*